July 15, 1969     D. B. CABLE     3,455,233
CHARCOAL OVEN
Filed July 24, 1967     2 Sheets-Sheet 1
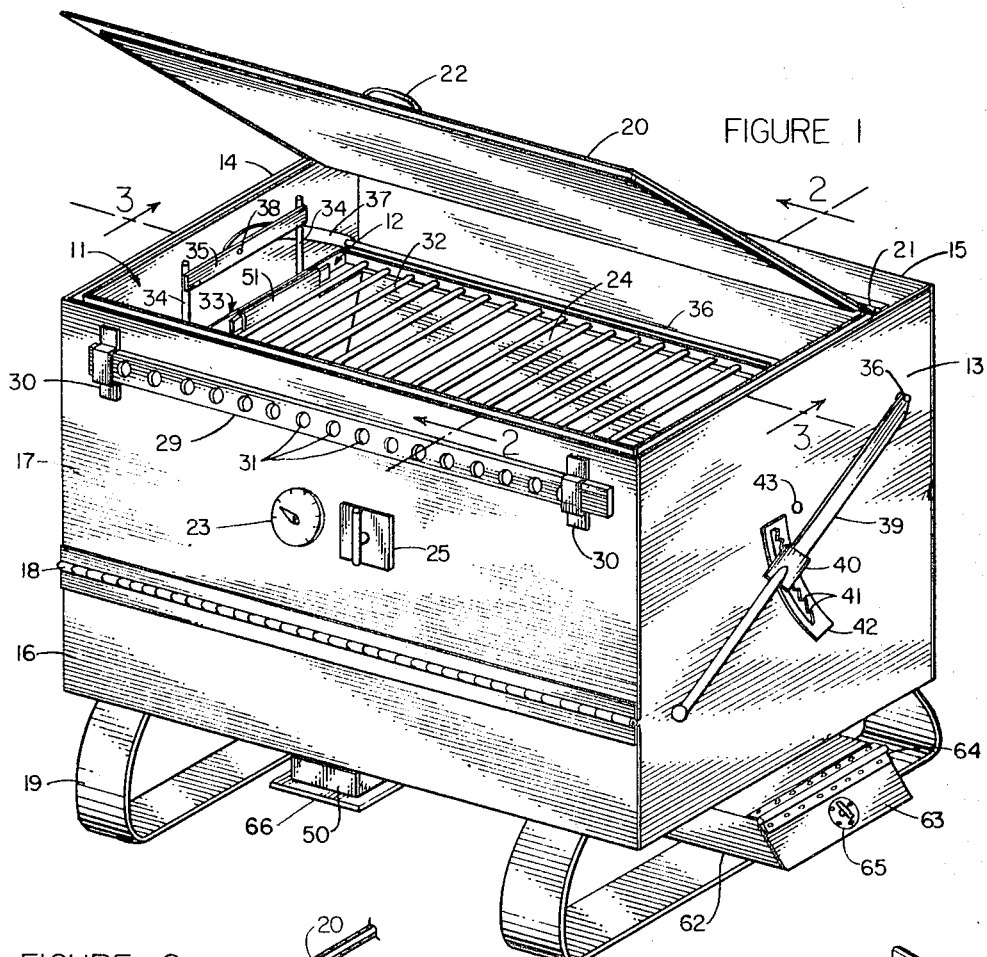
FIGURE 1
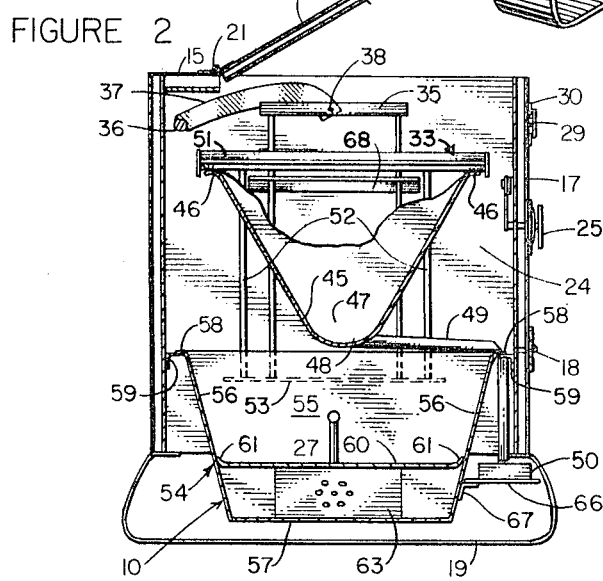
FIGURE 2
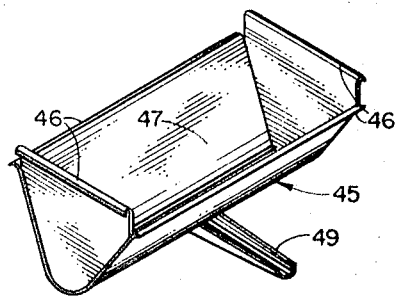
FIGURE 6
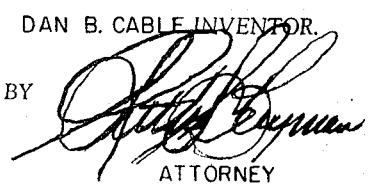
DAN B. CABLE INVENTOR.
BY
ATTORNEY July 15, 1969     D. B. CABLE     3,455,233
CHARCOAL OVEN
Filed July 24, 1967     2 Sheets-Sheet 2
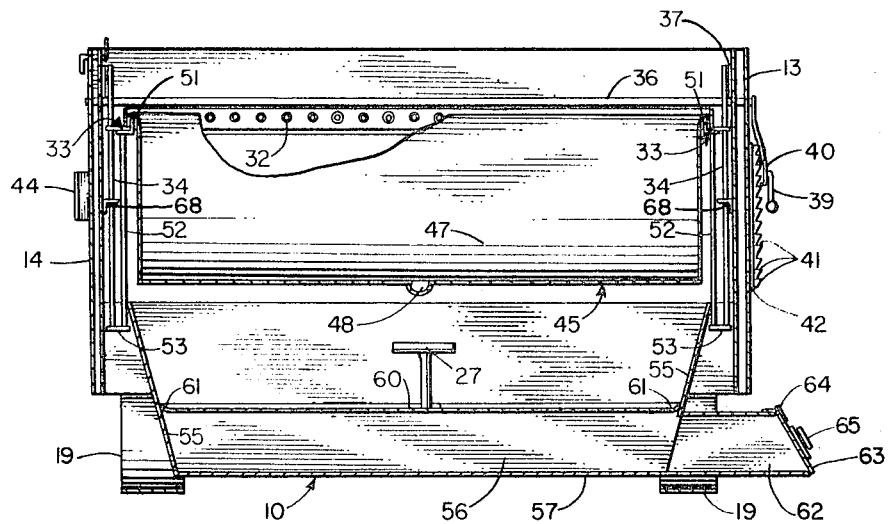
FIGURE 3
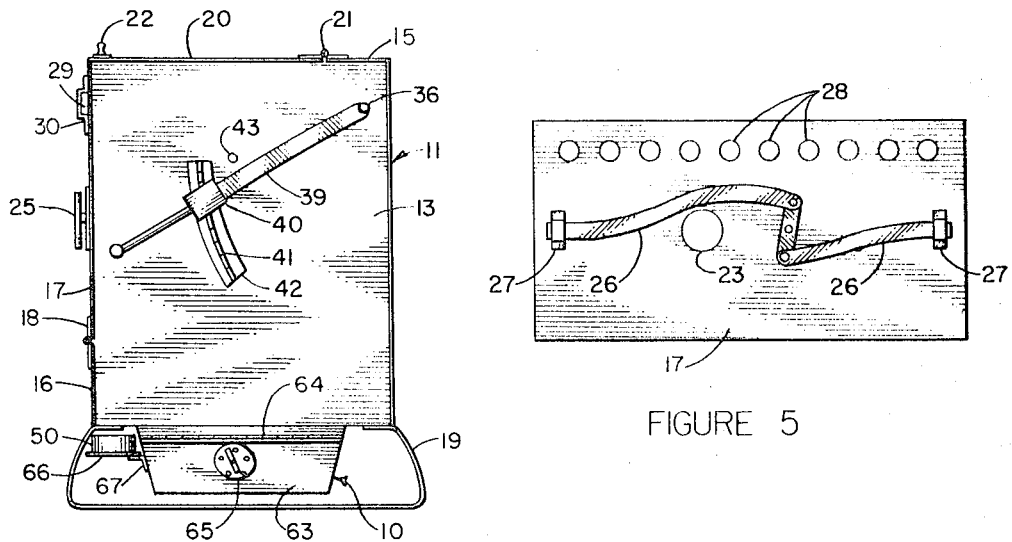
FIGURE 4     FIGURE 5
DAN B. CABLE, INVENTOR.
BY 
ATTORNEY United States Patent Office 3,455,233
Patented July 15, 1969

3,455,233
CHARCOAL OVEN
Dan B. Cable, 3303 Elton Road,
Spokane, Wash. 99206
Filed July 24, 1967, Ser. No. 655,424
Int. Cl. A47j 37/04
U.S. Cl. 99—443                    1 Claim

ABSTRACT OF THE DISCLOSURE

A portable charcoal heated enclosed cooking chamber with adjustable drafts and particularly configured adjustment means regulating distance between food supporting element and heat source. The food supporting element has an associated grease removal element to prevent dripped grease from contacting the charcoal heat source. The cooking chamber is particularly enclosed to prevent escapement of fire excessive heat, or burning elements to especially adapt it for use in high fire hazard areas.

BACKGROUND OF INVENTION

Field of invention

This invention relates generally to a charcoal heated enclosed cooking chamber and more particularly to such a device that has adjustments to regulate the cooking of food therein and is externally enclosed to prevent escapement of excessive heat, fire or burning elements to especially adapt it for use in high fire hazard areas.

Description of prior art

Since times immemorial it has been found desirable to provide various cooking utensils to render food into a palatable form with an application of heat applied from burning charcoal. Many such devices have heretofore become known in the art. Charcoal cookery has, however, heretofore been regarded as rather a primitive process and most of the known devices have so treated it in making no provision for adequate adjustment to control, especially, charcoal draft, cooking chamber heat, distance between food being cooked and heat source, smoke content of cooking area, and the like. Such prior art devices have also generally been adapted for use in areas of no particular fire hazard, and there has therefore been no provision for complete containment of burning elements and prevention of exit of excessive heat and fire from the cooking vessel, while yet maintaining a structure with potential portability.

With these thoughts in mind the instant invention was conceived to provide a professional cooking type device, having adequate adjustment means of the variables associated with such type of cookery, that is completely enclosed to allow its use in high fire hazard areas, as in the forest during their driest periods.

The instant invention is distinguishable from the prior art in these particulars.

SUMMARY OF INVENTION

Cooking by heat from a burning charcoal source may be either of the broiling nature, depending principally upon heat radiated directly from the heat source to the cooking product; or of the baking nature, wherein there is some confinement and containment of heat around the cooked object, so that part or all of its heating is caused by convection and conductive heat from the heated atmosphere thereabout. The instant invention seeks to provide a charcoal fueled cooking device adapted to accomplish either or both of these types of cookery. For either type of cookery, obviously, a source of burning charcoal must be maintained in proximate relationship with the food to be acted upon, and again, if a convectional type heating be desired, the relationship of the heat source and food must generally be a vertical one with heat source lowermost.

The instant invention provides a lower charcoal pan supported above the surface of the earth with sufficient space therebelow to prevent initiation of fire on the ground therebeneath and a means of adjustably supplying draft thereto. A housing is provided about the upper portion of this fire pan, having various opening portions to provide access to its interior, and supporting therein above the charcoal source a food supporting element that may be adjustably positioned to vary the distance between it and the charcoal pan. The food supporting element may be of the spit type or of the grill type, and either is provided with an associated drip pan interposed between food supporting element and heat source to remove grease dripping from cooked food carried thereby before the grease reaches the charcoal therebelow. A second draft is provided in a part of the upper structure to cooperate with the lower charcoal draft to aid in determining temperature in the cooking chamber and to regulate the amount of smoke contained therein. A thermostatic element is provided to indicate the temperature existing in the cooking chamber during use. The entire structure is enclosed to prevent exit of any burning materials, fire or excessive heat that would have a potentiality of igniting combustible material immediately adjacent the unit.

The purposes of this structure are:

To provide a charcoal heated cooking unit that might cook food in the traditional broiling manner by radiant heat or in the traditional baking method by convection-conduction, or by any combination of these methods:

To provide such a unit that may be completely enclosed to prevent exit therefrom of excessive heat, fire or burning elements that potentially may ignite surrounding combustible material, but yet provide a structure that is readily openable to provide access to the chamber and readily portable;

To provide such a unit that has adequate means of adjustment to effectively cook thereon;

To provide such a device that is of new and novel design, of sturdy and durable nature, of simple and economic manufacture, and one that is otherwise well adapted to the uses and purposes for which it is intended.

Other and further objects of my invention will become apparent from the following specification and drawings which form a part of this application. In carrying out these objects and purposes, however, it is to be understood that essential features are susceptible of change in design and structural arrangement with only one preferred and practical embodiment being illustrated in the accompanying drawings, as required.

BRIEF DESCRIPTION OF DRAWINGS

In the accompanying drawings which form a part of this specification, and wherein like numbers of reference refer to like parts throughout:

FIGURE 1 is a surface isometric view of my invention showing its various parts, their configuration and relationship.

FIGURE 2 is a transverse medial cross-sectional view of the device of FIGURE 1 taken on the vertical plane 2—2 thereon, in the direction indicated by the arrows.

FIGURE 3 is an elongate cross-sectional view of the device of FIGURE 1 taken on the vertical plane 3—3 thereon, in the direction indicated by the arrows.

FIGURE 4 is an orthographic end view of my invention, showing particularly the grill adjusting lever and draft features.

FIGURE 5 is a view of the rear surface of the front door of my invention, showing particularly the latch construction.

FIGURE 6 is an isometric surface view of the drip pan of my invention.

DESCRIPTION OF PREFERRED EMBODIMENT

Referring now to the drawings in more detail and particulary that of FIGURE 1, it will there be seen that my invention includes, generally, charcoal pan 10 supported and partially encased by oven body 11, in turn internally supporting food carrying structure 12.

Oven body 11 is a rectilinear box-like form including right end 13, and opposed left end 14 structurally joined by back 15 and lower front portion 16. Front door 17 forms the upper portion of the complete front of the oven structure by pivotally communicating by piano hinge 18 with the upper edge of the lower front element 16. Each of these members is preferably formed from sheet-like material having opposed inner and outer surfaces maintained at spaced distance with a dead air space therebetween to aid in preventing the passage of heat through such elements.

Oven body 11 is supported on some planar surface by leg structure 19 communicating with the lower extensions of the body elements. The structure is maintained at a spaced distance above the supporting surface to allow free circulation of air to prevent the excessive conduction of heat between the oven and the supporting surface.

Planar top 20, adapted to cover the upper orifice of body 11, pivotably communicates by piano hinge 21 to the upper portion of back element 15. This top carries handle 22 in its forward medial part to aid in raising it as desired.

Front door 17 is provided in its central part with thermostat 23 with sensor communicating therethrough to indicate temperature in chamber 24 enclosed by oven body 11. Handle 25 pivotably communicates through the door to paired opposed latcharms 26 carried on the inner surface of door 17 to cooperate with hasps on the oven sides to maintain the door in closed position upon appropriate rotary manipulation of handle 25. At a parallel spaced distance below the upper edge of door 17 are plural spaced aligned holes 28 adapted to allow passage of a draft therethrough; a draft bar 29 is slideably mounted on the outer surface of door 17 by plural brackets 30; this bar carries plural spaced aligned holes 31 each adapted to cooperate in paired fashion with holes 28 to allow draft therethrough when draft bar 29 be appropriately positioned in alignment therewith and to shutoff the draft completely at an intermediate position.

Food carrying structure 12, includes grill 32 supported between parallel opposed angle members 33, each in turn communicating by rods 52 and lower cross members 53 with spaced vertical support rods 34, aligned in their uppermost extension by cross element 35. Vertical support rods 34 are guided in their motion by opposed brackets 68 carried on the inner surface of the oven ends. Grill adjustment rod 36 extends between the external surfaces of ends 13, 14 and is pivotally carried thereby. This rod has plural perpendicularly extending lifting arms 37, irrotatably joined thereto at each end, said arms pivotally communicating with cross elements 35 in their medial part by pins 38. The right end of grill adjustment rod 36 has perpendicularly forwardly extending adjustment handle 39 carrying in its medial portion the dog 40 adapted to fit within one of plural adjustment grooves 41 of adjustment ratchet 42 carried by right end 13. Dog 40 is maintained in an appropriate notch 41 by elastic force in the adjustment handle 39.

Paired opposed holes 43 are provided in the medial portions of ends 13, 14 to mount a conventional barbeque spit (not shown) and bracket 44 is provided on left end 14 to mount the motor housing traditionally associated with such a spit to turn it during a cooking operation.

Grease pan 45 is interposed below the grill to catch drippings from food being cooked thereon. This pan has outwardly flaring side lips 46 about its periphery with a central portion 47 draining to a sump 48 which communicates by spout 49 to a grease container 50. The grease pan is releasably supported in the structure upon opposed end channels 51 communicating by support rods 52 to lower cross member 53 which in turn communicates with the lower extensions of grill support arms 34 to transmit their vertical positioning to the grease pan. Preferably the central portion of the grease pan extends downwardly to some depth to accommodate food carried by a spit.

Charcoal pan 54 has upwardly and outwardly flaring similar opposed ends 55 communicating by sides 56 and bottom 57. The upper periphery of the pan is formed with outwardly flaring lip 58 to aid in supporting the pan upon inwardly extending L-shaped channels 59 structurally carried by the innermost surface of the oven body 11 to provide a releasable mounting of the pan in the oven structure. Charcoal grate 60 is of similar cross-sectional shape to that of pan 54 and of such size that its upwardly flaring lips 61 will communicate with the upper surface of the sides of charcoal pan 54 at a spaced distance above its bottom 57. A medial handle 27 is provided to aid in manipulating the grate, particularly when hot.

Draft channel and ash cleanout 62 extends laterally outward from charcoal pan 54 to the lateral surface of oven body 11. Cover 63 is pivotally mounted thereover by hinge 64 and manually adjustable draft element 65 is provided therein to allow minor regulation of drafts passing therethrough.

Grease pan shelf 66 is mounted on the lower medial forward part of the charcoal pan 54 by brackets 67.

From the foregoing description of the structure of my invention its operation can now be understood.

Firstly the charcoal oven according to the foregoing teachings is constructed. To use the oven, charcoal (not shown) is established on charcoal grate 60, ignited and brought to a proper cooking condition. The draft upon the charcoal may be regulated by a joint regulation of the inward draft through channel 62 and outwardly draft through holes 28 in the upper portion of the chamber. The temperature may be determined from thermostat 23 and the draft elements appropriately positioned to maintain the temperature at any desired level. The grill is nextly adjusted, if it be desired to grill a particular food being cooked, to an appropriate height at a spaced distance above the charcoal for proper cooking by adjustment of handle 39. In this condition either top 20 or front door 17 may be opened, if they are not already open, and the food (not shown) to be cooked placed in appropriate position on top of the grill, to be supported thereby. The food may be cooked with the grill in an open condition or, if desired, the grill may be completely enclosed and the cooking carried out similarly to the baking process.

From the foregoing description it is to be noted particularly that my invention may be left open and used in the normal fashion of a charcoal grill or may be completely enclosed to accomplish a cooking of the baking nature commonly accomplished in oven structures, particularly as in traditional Chinese barbeque ovens.

It is further to be noted that if a smoky flavored food be desired, during the cooking process an additional smoke forming agent may be added to the charcoal and the smoke formed thereby maintained in the cooking chamber during the cooking process by appropriate draft regulation.

It is further to be noted that with my invention in closed condition there is very little likelihood that any fire or burning matter might be accidently removed therefrom by the user or by natural causes and there is very little likelihood that any heat sufficient to cause combustion in adjacent matter surrounding the oven may be transferred therefrom by conduction or otherwise.

The foregoing description of my invention is necessarily of a detailed nature so that a specific embodiment of it might be set forth as required, but it is to be understood that various modifications of detail and rearrangement and multiplication of parts may be resorted to without departing departing from its spirit, essence or scope.

Having thusly described my invention, what I desire to protect by Letters Patent, and

What I claim is:

1. A charcoal cooking oven of the nature aforesaid comprising, in combination:

an open bottom box-like peripheral oven member defining a cooking chamber and having a pivotably mounted front door and a pivotably mounted top to allow access to said chamber, the structure being supported at a spaced distance above a supporting surface by downwardly depending legs;

a grill member carried in the upper portion of said cooking chamber for adjustable vertical motion;

means of adjustably positioning said grill member within the upper portion of said oven structure including paired opposed vertically disposed rods communicating by cross-members and mounted for substantially vertical motion by brackets on the inner medial surface of the opposed end elements of the cooking chamber;

a charcoal pan releasably carried by and forming the lower element of the lower portion of said oven member having a manually adjustable draft communicating with the lower portion thereof;

a grate removably carried in said charcoal pan at spaced distance above its bottom; and a grease pan removably carried between said grill an said charcoal pan, adapted to remove grease presen ed thereto from above.

References Cited

UNITED STATES PATENTS

| | | | |
|---|---|---|---|
| 1,137,130 | 4/1915 | Green | 99—443 X |
| 2,608,190 | 8/1952 | Winning et al. | |
| 2,746,377 | 5/1956 | Parks | 99—446 X |
| 2,763,200 | 9/1956 | Kittler | 99—425 X |
| 2,806,463 | 9/1957 | Smith. | |
| 2,894,448 | 7/1959 | Henderson et al. | 126—25 X |
| 3,045,582 | 7/1962 | Wells | 126—25 X |
| 3,124,057 | 3/1964 | Kiser | 126—25 X |
| 3,217,634 | 11/1965 | Fox | 99—446 X |
| 3,285,239 | 11/1966 | Drake | 99—446 X |
| 3,379,190 | 4/1968 | Leach | 126—2 |

WILLIAM I. PRICE, Primary Examiner

ARTHUR O. HENDERSON, Assistant Examiner

U.S. Cl. X.R.

99—446